United States Patent

Jarlance-Huang

[11] Patent Number: 5,668,574
[45] Date of Patent: Sep. 16, 1997

[54] PALM-TOP WIRELESS TRACKBALL

[75] Inventor: Jarlance-Huang, Tao Yuan Hsien, Taiwan

[73] Assignee: Chung-Chin Chen, Alexandria, Va.

[21] Appl. No.: 494,352

[22] Filed: Jun. 26, 1995

[51] Int. Cl.$^6$ .................................................. G09G 5/08
[52] U.S. Cl. ...................................... 345/158; 345/167
[58] Field of Search ................................ 345/158, 167,
345/157, 156, 163, 184; D14/101, 114;
273/148 B; 74/471 XY; 200/6 A, 5 R, 6 R,
341; 348/734; H04N 5/44

[56] References Cited

U.S. PATENT DOCUMENTS

| Re. 34,931 | 5/1995 | Duchon | 345/167 |
| 5,162,780 | 11/1992 | Solhjell | 345/167 |
| 5,506,605 | 4/1996 | Paley | 345/158 |
| 5,539,479 | 7/1996 | Bertram | 345/158 |

Primary Examiner—Chanh Nguyen
Attorney, Agent, or Firm—Bacon & Thomas

[57] ABSTRACT

A palm-top wireless trackball including a mainframe to hold a circuit board on the inside, a hand-hold portion defined within said mainframe and having two smoothly curved opposite sides fitting the palm and the finger cushions, an operation area in the hand-hold portion, a smoothly curved stop flange raised from the bottom of the operation area, a transverse groove adjacent to the stop flange for resting the middle finger, and a transparent shade covered on the operation area to hold a transmitter on the inside, permitting the transmitter to be controlled by the circuit board, a circular ball holder raised from the top side of the operation area to hold a trackball for permitting the trackball to be rotated within the ball holder to trigger the circuit board in sending a corresponding radio signal through the transmitter, a drag key disposed in front of the smoothly curved stop flange and connected to the circuit board for operation by the forefinger, and an enter key transversely mounted on the hand-hold portion around the ball holder and connected to the circuit board for operation by the thumb.

3 Claims, 2 Drawing Sheets

PALM-TOP WIRELESS TRACKBALL

BACKGROUND OF THE INVENTION

The present invention relates to a palm-top wireless trackball for use with a computer system. The palm-top wireless trackball has an ergonomically engineered hand-hold portion fitting the palm and the finger cushions, a trackball and an enter key at the top side of an operation area defined within the hand-hold portion for operation by the thumb, a stop flange raised from the bottom side of the operation area, a drag key in front of the stop flange for operation by the forefinger, and a transverse groove at the bottom side of the operation area for resting the middle finger.

SUMMARY OF THE INVENTION

According to one aspect of the present invention, the palm-top wireless trackball comprises a mainframe to hold a circuit board on the inside, a hand-hold portion defined within said mainframe and having two smoothly curved opposite sides fitting the palm and the finger cushions, an operation area in the hand-hold portion, a smoothly curved stop flange raised from the bottom of the operation area, and a transparent shade covered on the front end of the operation area to hold a transmitter on the inside, permitting the transmitter to be controlled by the circuit board, a circular ball holder raised from the top side of the operation area to hold a trackball for permitting the trackball to be rotated within the ball holder to trigger the circuit board in sending a corresponding radio signal through the transmitter, a drag key disposed in front of the smoothly curved stop flange and connected to the circuit board for operation by the forefinger, and an enter key transversely mounted on the hand-hold portion around the ball holder and connected to the circuit board for operation by the thumb.

According to another aspect of the present invention, a transverse groove is made on the bottom side of the operation area adjacent to the stop flange for resting the middle finger.

According to still another aspect of the present invention, the enter key is transversely disposed between the hand-hold portion and the ball holder, having two opposite ends curved forwardly outwards around the ball holder convenient for operation by the thumb of the left hand or the thumb of the right hand.

According to still another aspect of the present invention, the ball holder is covered with a cap to hold the trackball in place, having a smoothly curved top edge fitting the smoothly curved top side of the cap and disposed in flush with the top of the enter key.

DETAILED DESCRIPTION OF THE PREFERRED EMBODIMENT

Figure 1:
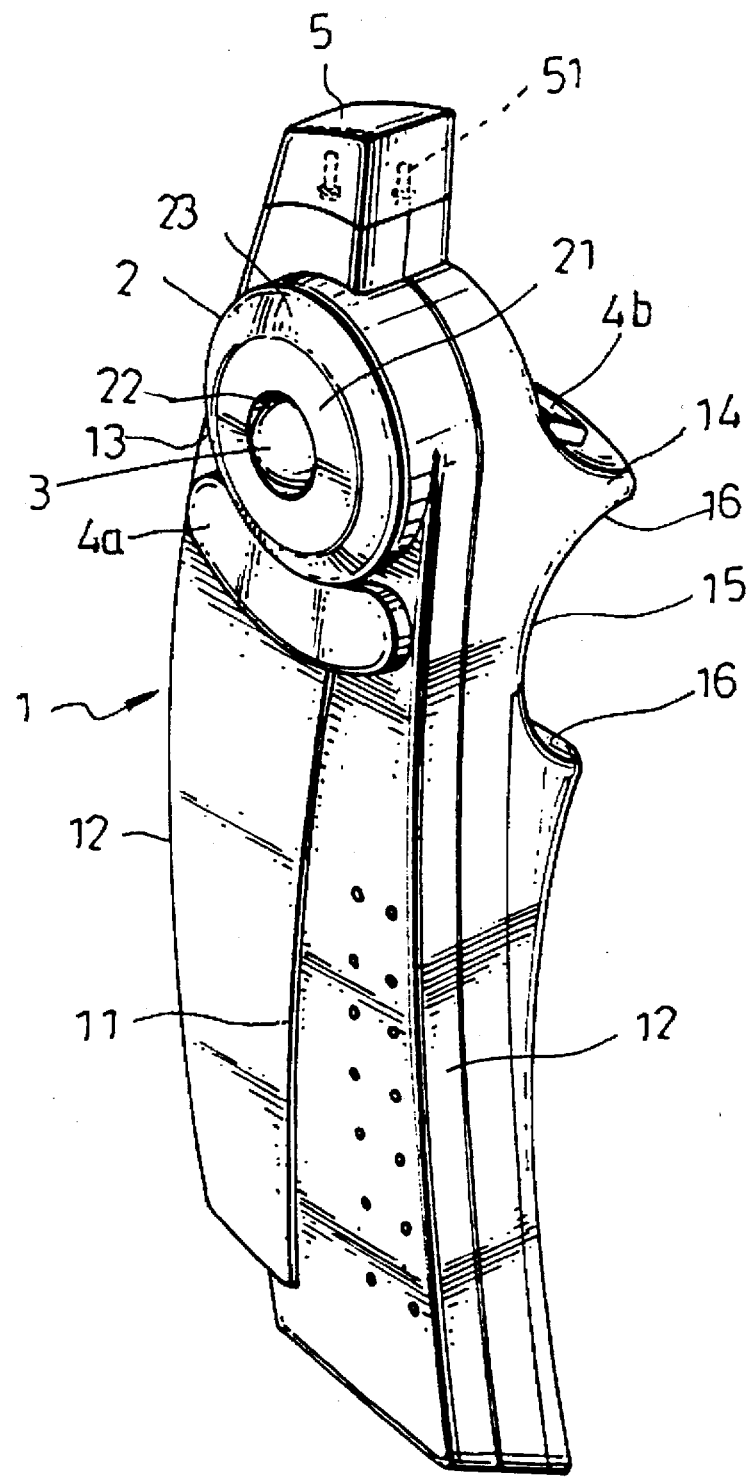
FIG. 1 is an elevational view of a palm-top wireless trackball according to the present invention.

Referring to FIG. 1, a palm-top wireless trackball in accordance with the present invention is generally comprised of a mainframe 1, a circular ball holder 2, a trackball 3, an enter key 4a, a drag key 4b, and a transparent shade 5.

Referring to FIG. 1 again, the mainframe 1 comprises a hand-hold portion 11 having two smoothly curved opposite sides 12 fitting the palm and the finger cushions, and an operation area 13 in the hand-hold portion 11 at a suitable location. The circular ball holder 2 is raised from the operation area 13 to hold the trackball 3. A cap 21 is mounted on the ball holder 2 to hold the trackball 3 in the ball holder 2, having a circular center opening 22 through which a part of the trackball 3 protrudes over the cap 21. The enter key 4a is mounted on the hand-hold portion 11 of the mainframe 1 close to the ball holder 2. The transparent shade 5 is covered on the front end of operation area 13 of the mainframe 1 to hold a transmitter 51 on the inside, permitting the transmitter 51 to be connected to the remote-control circuit board inside the mainframe 1. The remote-control circuit board is of the known art and not within the scope of the present invention, therefore it is neither shown in the drawings nor described in detail. The mainframe 1 further comprises a smoothly curved stop flange 14 raised from the bottom side of the operation area 13 for resting the forefinger, a transverse bottom groove 15 adjacent to the stop flange 14 for resting the middle finger. The drag key 4b is disposed in front of the smoothly curved stop flange 14 and connected to the circuit board inside the mainframe 1. When the mainframe 1 is held in the palm, the thumb is moved between the control key 4a and the trackball 3 in the ball holder 2, and the middle finger is inserted through the transverse bottom groove 15 and stopped between two opposite side walls 16 of the transverse bottom groove 15 to prevent the mainframe 1 from falling out of the hand. The enter key 4a is transversely disposed between the hand-hold portion 11 and the ball holder 2, having two opposite ends curved forwardly outwards around the ball holder 2 convenient for operation by the thumb of the left hand or the thumb of the right hand. The trackball 3, the enter key 4a and the drag key 4b are connected to the circuit board inside the mainframe 1 by conductors (not shown). The cap 21 has a smoothly curved top side fitting the trackball 3. The ball holder 2 has a smoothly curved top edge 23 fitting the smoothly curved top side of the cap 21 and disposed in flush with the top of the enter key 4a. Therefore, the thumb can be smoothly moved between the enter key 4a and the trackball 3.

Figure 2:
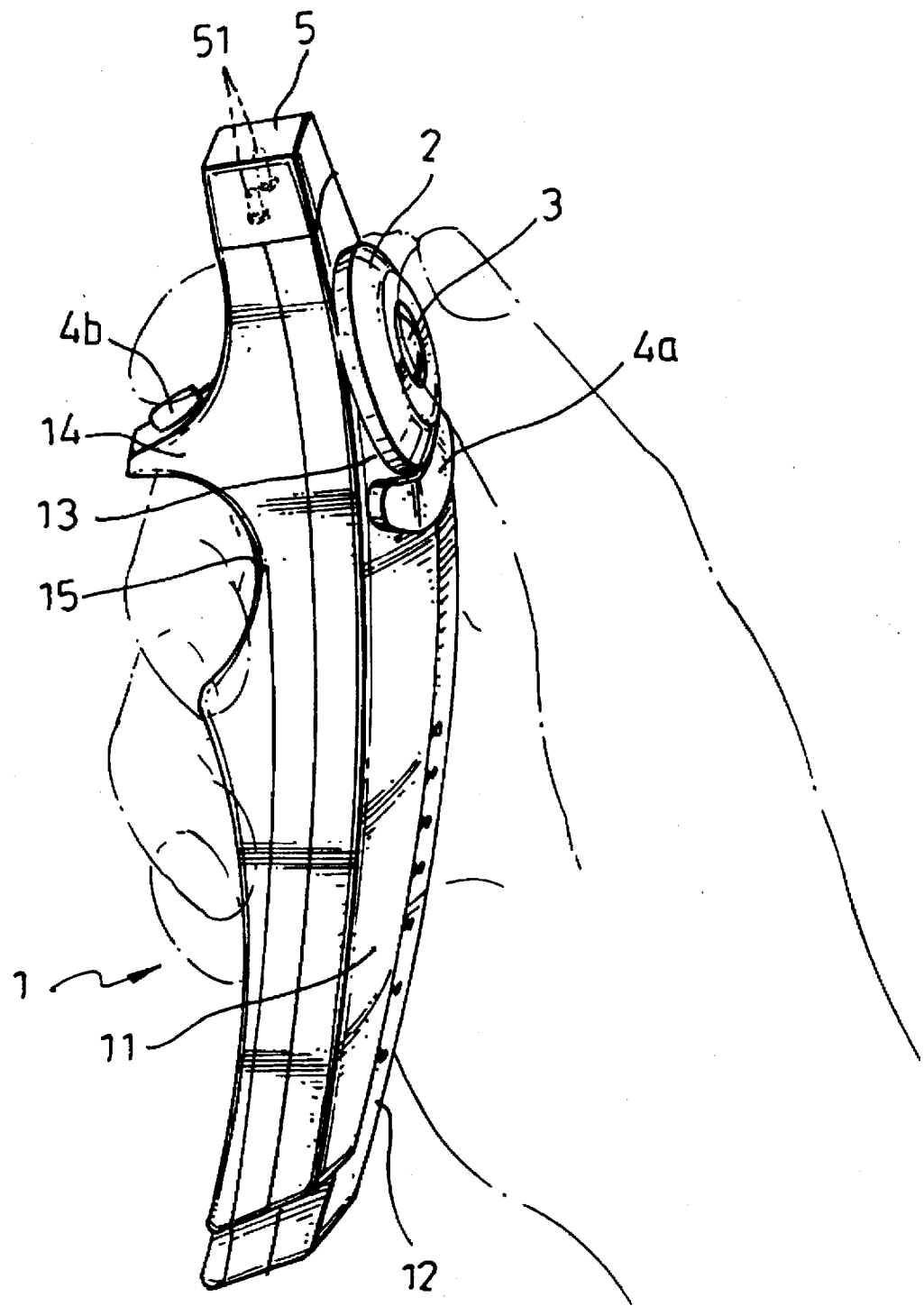
FIG. 2 is a schematic drawing showing the palm-top wireless trackball held in the hand and operated.

Referring to FIG. 2 and FIG. 1 again, when the palm-top wireless trackball is held in the hand, the palm and the finger cushions are respectively rested on the smoothly curved opposite sides 12 of the hand-hold portion 11, the thumb is rested on the trackball 3 or the enter key 4a, the middle finger is rested on the transverse groove 15, and the forefinger is rested on the drag key 4b in front of the smoothly curved stop flange 14 for pulling the drag key 4b leftwards or rightwards. When the trackball 3 is rotated by the thumb, the circuit board is triggered to provide a radio signal. The radio signal is transmitted through the transmitter 51 to the mainframe of the computer system with which the plam-top wireless trackball is used, and therefore the cursor is moved in the display of the computer system. When to show stored data in the display, the thumb is moved from the trackball 3 to the enter key 4a and then pressed on the enter key 4a, and at the same time the finger cushion of the forefinger is rested on the drag key 4b to move it leftwards or rightwards. Therefore, the switching operation is conveniently achieved.

It is to be understood that the drawings are designed for purposes of illustration only, and are not intended as a definition of the limits and scope of the invention disclosed.

I claim:

1. A palm-top wireless trackball comprising a mainframe to hold a circuit board, said mainframe comprising a hand-hold portion having two smoothly curved opposite sides fitting palm and finger cushions of a user, an operation area in said hand-hold portion, a smoothly curved stop flange extending from a bottom side of said operation area, a transverse groove formed in a bottom side of said hand hold portion adjacent to said stop flange for resting a middle finger of a user, a transparent shade on a front end of said operation area to cover a transmitter, permitting said transmitter to be controlled by said circuit board, a circular ball holder extending from a top side of said operation area opposite to said stop flange, a trackball rotatably located within said ball holder to control said circuit board in sending a corresponding radio signal through said transmitter, a drag key disposed on a front of said smoothly curved stop flange and connected to said circuit board for operation by the forefinger of a user, and an enter key mounted on said hand-hold portion adjacent to said ball holder and connected to said circuit board for operation by the thumb of a user.

2. The palm-top wireless trackball of claim 1 wherein said enter key comprises an arcuate key transversely disposed between said hand-hold portion and said ball holder extending partially around said ball holder for operation by a thumb of a left hand or a thumb of a right hand of the user.

3. The palm-top wireless trackball of claim 1 wherein said ball holder further comprises a cap covering said ball holder to hold said trackball in place, said cap having a smoothly curved top side fitting said trackball and a circular center opening, through which a part of said trackball protrudes from said ball holder, said ball holder having a smoothly curved top edge fitting the smoothly curved top side of said cap and disposed in flush with said enter key.

* * * * *